(12) United States Patent
Sakai

(10) Patent No.: US 12,109,886 B2
(45) Date of Patent: *Oct. 8, 2024

(54) CONTROL DEVICE, CONTROL METHOD, AND RECORDING MEDIUM

(71) Applicant: HONDA MOTOR CO., LTD., Tokyo (JP)

(72) Inventor: Ryoji Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 808 days.

This patent is subject to a terminal disclaimer.

(21) Appl. No.: 17/210,541

(22) Filed: Mar. 24, 2021

(65) Prior Publication Data

US 2021/0300181 A1  Sep. 30, 2021

(30) Foreign Application Priority Data

Mar. 31, 2020  (JP) ................................. 2020-064544

(51) Int. Cl.
*B60K 35/00* (2024.01)
*B60L 58/30* (2019.01)
(Continued)

(52) U.S. Cl.
CPC .............. *B60K 35/00* (2013.01); *B60L 58/30* (2019.02); *B60R 16/033* (2013.01); *B60K 35/22* (2024.01);
(Continued)

(58) Field of Classification Search
None
See application file for complete search history.

(56) References Cited

U.S. PATENT DOCUMENTS 6,484,088 B1  11/2002  Reimer
7,693,651 B2   4/2010  Proefke et al.
(Continued)

FOREIGN PATENT DOCUMENTS

CN  105599614  5/2016
CN  110901418  3/2020
(Continued)

OTHER PUBLICATIONS

Chinese Office Action for Chinese Patent Application No. 202110283318.5 mailed Jun. 22, 2023.
(Continued)

*Primary Examiner* — Tracy M Dove
(74) *Attorney, Agent, or Firm* — Amin, Turocy & Watson, LLP

(57) ABSTRACT

A control device includes a first accumulation unit configured to accumulate first energy, a second accumulation unit configured to accumulate second energy different from the first energy, and a supply unit configured to supply either or both of second energy obtained by converting first energy accumulated by the first accumulation unit and second energy accumulated by the second accumulation unit to an external device. The amount of second energy that is supplied from the supply unit to the external device is calculated on the basis of the amount of second energy supplied to a drive unit via the supply unit to move the moving body to a destination, the amount of first energy accumulated by the first accumulation unit, and the amount of second energy accumulated by the second accumulation unit, and a display device is caused to display a supply available time according to the calculated amount of second energy.

6 Claims, 7 Drawing Sheets

(51) Int. Cl.
  *B60R 16/033*  (2006.01)
  *B60K 35/22*  (2024.01)
  *B60K 35/28*  (2024.01)
(52) U.S. Cl.
  CPC ........ *B60K 35/28* (2024.01); *B60K 2360/166* (2024.01); *B60K 2360/169* (2024.01)

(56) References Cited

U.S. PATENT DOCUMENTS

| | | | |
|---|---|---|---|
| 7,966,121 B2 | 6/2011 | Aoyagi et al. | |
| 8,504,236 B2 | 8/2013 | Guo et al. | |
| 9,789,775 B2 | 10/2017 | Kim et al. | |
| 9,909,913 B2 | 3/2018 | Tomita et al. | |
| 10,351,000 B2 | 7/2019 | Berentsen et al. | |
| 10,493,861 B2 | 12/2019 | Cun | |
| 11,332,036 B2 | 5/2022 | Perrone | |
| 11,807,106 B2 * | 11/2023 | Sakai | B60L 50/75 |
| 2002/0162694 A1 | 11/2002 | Iwasaki | |
| 2004/0008109 A1 | 1/2004 | Endoh | |
| 2004/0062963 A1 | 4/2004 | Umayahara et al. | |
| 2005/0149250 A1 | 7/2005 | Isaac | |
| 2006/0185756 A1 | 8/2006 | Sato et al. | |
| 2007/0007058 A1 | 1/2007 | Uenodai et al. | |
| 2007/0176762 A1 | 8/2007 | Aoyagi et al. | |
| 2007/0199747 A1 | 8/2007 | Aoyagi et al. | |
| 2008/0234888 A1 | 9/2008 | Zanardelli et al. | |
| 2012/0111447 A1 | 5/2012 | Mori et al. | |
| 2013/0009765 A1 | 1/2013 | Gilman et al. | |
| 2016/0137065 A1 | 5/2016 | Matsubara et al. | |
| 2017/0050534 A1 | 2/2017 | Kanazawa et al. | |
| 2018/0029498 A1 | 2/2018 | Taruya et al. | |
| 2018/0031405 A1 | 2/2018 | Berentsen et al. | |
| 2019/0176640 A1 | 6/2019 | Lee et al. | |
| 2019/0255952 A1 | 8/2019 | Cun | |
| 2020/0091524 A1 | 3/2020 | Umayahara et al. | |
| 2020/0180471 A1 | 6/2020 | Tsubosaka et al. | |
| 2020/0256700 A1 | 8/2020 | Ota | |
| 2020/0307621 A1 | 10/2020 | Ostrowski et al. | |
| 2021/0129824 A1 | 5/2021 | Sakai et al. | |
| 2021/0300181 A1 | 9/2021 | Sakai | |
| 2021/0402979 A1 | 12/2021 | Ono et al. | |
| 2022/0097523 A1 | 3/2022 | Ohki et al. | |
| 2022/0097560 A1 | 3/2022 | Sakurai | |
| 2022/0111739 A1 | 4/2022 | Sugimoto et al. | |

FOREIGN PATENT DOCUMENTS

| | | |
|---|---|---|
| JP | 2015-115982 | 6/2015 |
| JP | 2016-015825 | 1/2016 |
| JP | 2016-036235 | 3/2016 |
| JP | 2017-041966 | 2/2017 |
| JP | 2017-103938 | 6/2017 |
| JP | 2018-019571 | 2/2018 |
| JP | 2019-161687 | 9/2019 |
| WO | 2019/107598 | 6/2019 |

OTHER PUBLICATIONS

Japanese Office Action for Japanese Patent Application No. 2020-064544 mailed Jul. 25, 2023.

Non-Final Office Action for U.S. Appl. No. 17/210,568 dated Mar. 22, 2023.

\* cited by examiner

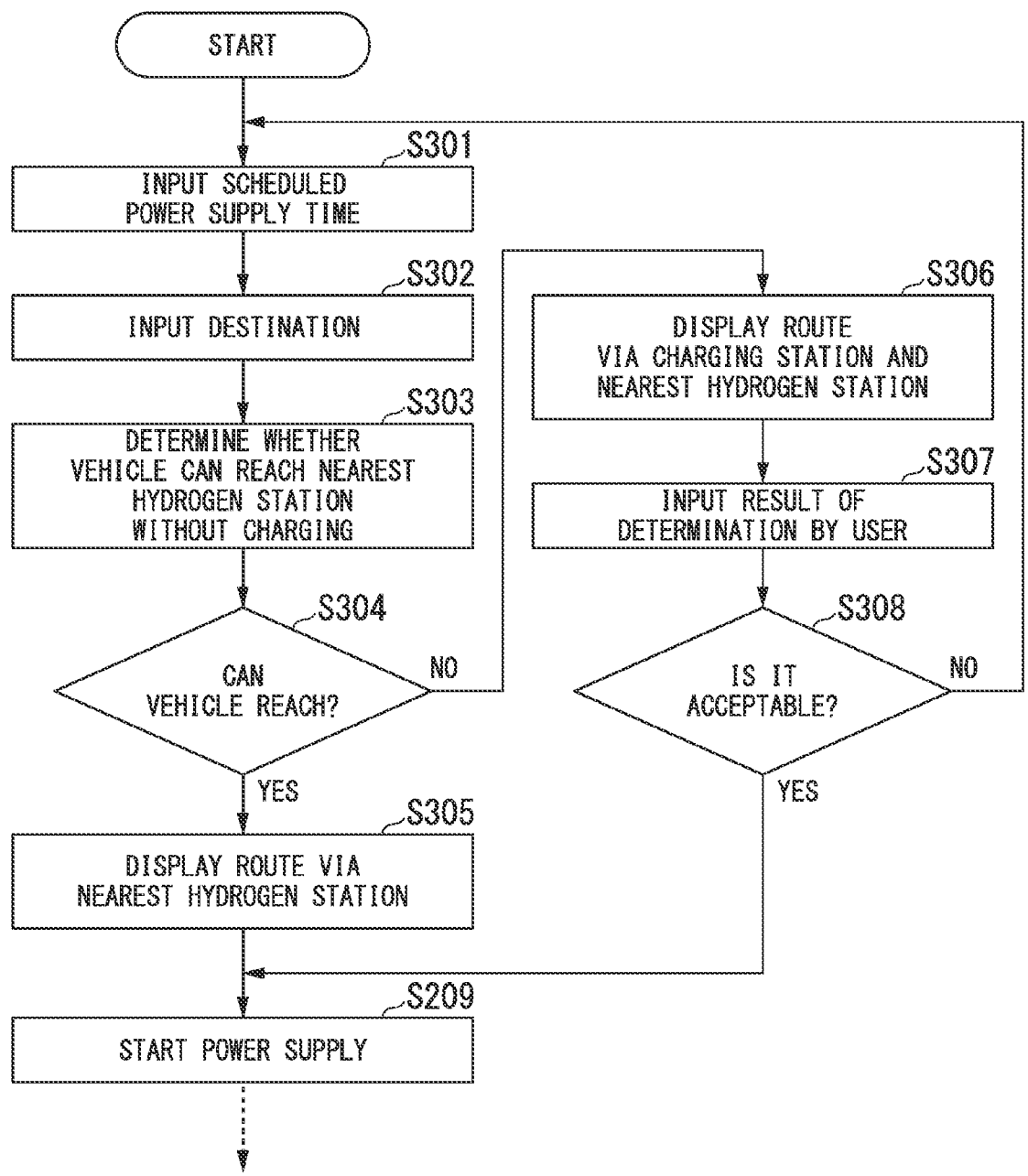

CONTROL DEVICE, CONTROL METHOD, AND RECORDING MEDIUM

CROSS-REFERENCE TO RELATED APPLICATION

Priority is claimed on Japanese Patent Application No. 2020-064544, filed Mar. 31, 2020, the content of which is incorporated herein by reference.

BACKGROUND OF THE INVENTION

Field of the Invention

The present invention relates to a control device, a control method, and a recording medium.

Description of Related Art

Moving bodies such as four-wheeled vehicles and two-wheeled vehicles equipped with fuel cells are widespread. The power accumulated by a moving body and the power generated in a moving body can be supplied not only to a power source when the moving body moves but also to an external electric device. In places where it is difficult to receive the supply of commercial power, convenience for a user is improved by using a moving body as a power source. In this manner, situations in which moving bodies are used as power sources are gradually increasing. It is conceivable to use a moving body as a power source outdoors where commercial power is not supplied, for example, at a campsite, or to use a moving body as a power source when commercial power cannot be supplied in the event of a disaster.

When a moving body is used as a power source, a distance that the moving body can move becomes shorter. To achieve a balance between a use as a power source and a moving distance, a method is known that allows the use as a power source when a certain amount of power can be supplied to the power source (for example, Japanese Unexamined Patent Application, First Publication No. 2017-041966).

SUMMARY OF THE INVENTION

However, in the above method, a moving body can only be used as a power source when it can move to a destination with fuel accumulated in the moving body, and there is room for improvement in convenience for a user.

In view of such circumstances, an object of the aspects of the present invention is to provide a control device, a control method, and a recording medium that can improve convenience for a user when a moving body is used as a supply source for supplying energy to an external device.

The present invention has adopted the following aspects to solve the problems described above.

(1): A control device according to one aspect of the present invention is a control device of a moving body that includes a first accumulation unit configured to accumulate first energy, a second accumulation unit configured to accumulate second energy different from the first energy, and a supply unit configured to supply either or both of the second energy obtained by converting the first energy accumulated by the first accumulation unit and the second energy accumulated by the second accumulation unit to an external device, and calculates the amount of second energy that is supplied from the supply unit to the external device on the basis of the amount of second energy supplied to a drive unit via the supply unit to move the moving body to a destination, the amount of first energy accumulated by the first accumulation unit, and the amount of second energy accumulated by the second accumulation unit, and causes a display device to display a supply available time according to the calculated amount of second energy.

(2): In the aspect of (1) described above, the control device may calculate the amount of second energy that is supplied from the supply unit to the external device on the basis of a result of selection by a user on whether to receive supply of the second energy at a second supply station that supplies the second energy until the moving body reaches a first supply station that supplies the first energy, the amount of second energy supplied to the drive unit to move the moving body to the first supply station, the amount of first energy accumulated by the first accumulation unit, and the amount of second energy accumulated by the second accumulation unit.

(3): In the aspect of (2) described above, when an instruction indicating that the user does not accept the supply available time displayed on the display device is received, the control device may again receive a selection of whether to receive the supply of the second energy at the second supply station or a selection of the number of times the supply of the second energy is received at the second supply station, and calculate the amount of second energy that is supplied from the supply unit to the external device on the basis of a result of the selection performed again by the user, the amount of second energy supplied to the drive unit to move the moving body to the first supply station, the amount of first energy accumulated by the first accumulation unit, and the amount of second energy accumulated by the second accumulation unit.

(4): In the aspect of (2) or (3) described above, the control device may receive a supply time during which the supply of the second energy is received at the second supply station or the amount of second energy, and calculate the amount of second energy that is supplied from the supply unit to the external device on the basis of the received supply time or the received amount of second energy, the amount of second energy supplied to the drive unit to move the moving body to the first supply station, the amount of first energy accumulated by the first accumulation unit, and the amount of second energy accumulated by the second accumulation unit.

(5): A control device according to another aspect of the present invention is a control device of a moving body that includes a first accumulation unit configured to accumulate first energy, a second accumulation unit configured to accumulate second energy different from the first energy, and a supply unit configured to supply either or both of the second energy obtained by converting the first energy accumulated by the first accumulation unit and the second energy accumulated by the second accumulation unit to an external device, and receives a scheduled power supply time during which the second energy is supplied from the supply unit to the external device, detects a route to a destination on the basis of the amount of second energy supplied to a drive unit via the supply unit to move the moving body to the destination, the amount of first energy accumulated by the first accumulation unit, the amount of second energy accumulated by the second accumulation unit, and the amount of second energy supplied to the external device calculated based on the scheduled power supply time, and causes a display unit to display the detected route.

(6): In the aspect of any one of (1) to (5) described above, a distance that the moving body moves with the amount of first energy filled in the first accumulation unit may be longer than a distance that the moving body moves with the amount of second energy filled in the second accumulation unit.

(7): A control method according to still another aspect of the present invention includes, by a computer installed in a moving body that includes a first accumulation unit configured to accumulate first energy, a second accumulation unit configured to accumulate second energy different from the first energy, and a supply unit configured to supply either or both of the second energy obtained by converting the first energy accumulated by the first accumulation unit and the second energy accumulated by the second accumulation unit to an external device, calculating the amount of second energy that is supplied from the supply unit to the external device on the basis of the amount of second energy supplied to a drive unit via the supply unit to move the moving body to a destination, the amount of first energy accumulated by the first accumulation unit, and the amount of second energy accumulated by the second accumulation unit, and causing a display unit to display a supply available time according to the calculated amount of second energy.

(8): A computer-readable non-transitory recording medium according to still another aspect of the present invention stores a program causing a computer of a moving body, which includes a first accumulation unit configured to accumulate first energy, a second accumulation unit configured to accumulate second energy different from the first energy, and a supply unit configured to supply either or both of the second energy obtained by converting the first energy accumulated by the first accumulation unit and the second energy accumulated by the second accumulation unit to an external device, to execute calculating the amount of second energy that is supplied from the supply unit to the external device on the basis of the amount of second energy supplied to a drive unit via the supply unit to move the moving body to a destination, the amount of first energy accumulated by the first accumulation unit, and the amount of second energy accumulated by the second accumulation unit, and causing a display unit to display a supply available time according to the calculated amount of second energy.

According to (1) to (8) described above, it is possible to improve convenience for a user when a moving body is used as a supply source for supplying energy to an external device.

BRIEF DESCRIPTION OF THE DRAWINGS

FIG. 7 is a flowchart which shows an example of control processing performed by a control unit in a modified example.

DETAILED DESCRIPTION OF THE INVENTION

Hereinafter, embodiments of a control device, a control method, and a recording medium according to the present invention will be described with reference to the drawings. In the embodiments, as one aspect of a moving body, a fuel cell vehicle will be described as an example. A fuel cell vehicle is a vehicle that uses hydrogen, carbonized hydrogen, or alcohol as a fuel, supplies electric power extracted according to an electrochemical reaction to the fuel to an electric motor and travels. In the embodiments, as one type of a fuel, hydrogen will be described as an example.

[Fuel Cell Car]

Figure 1:
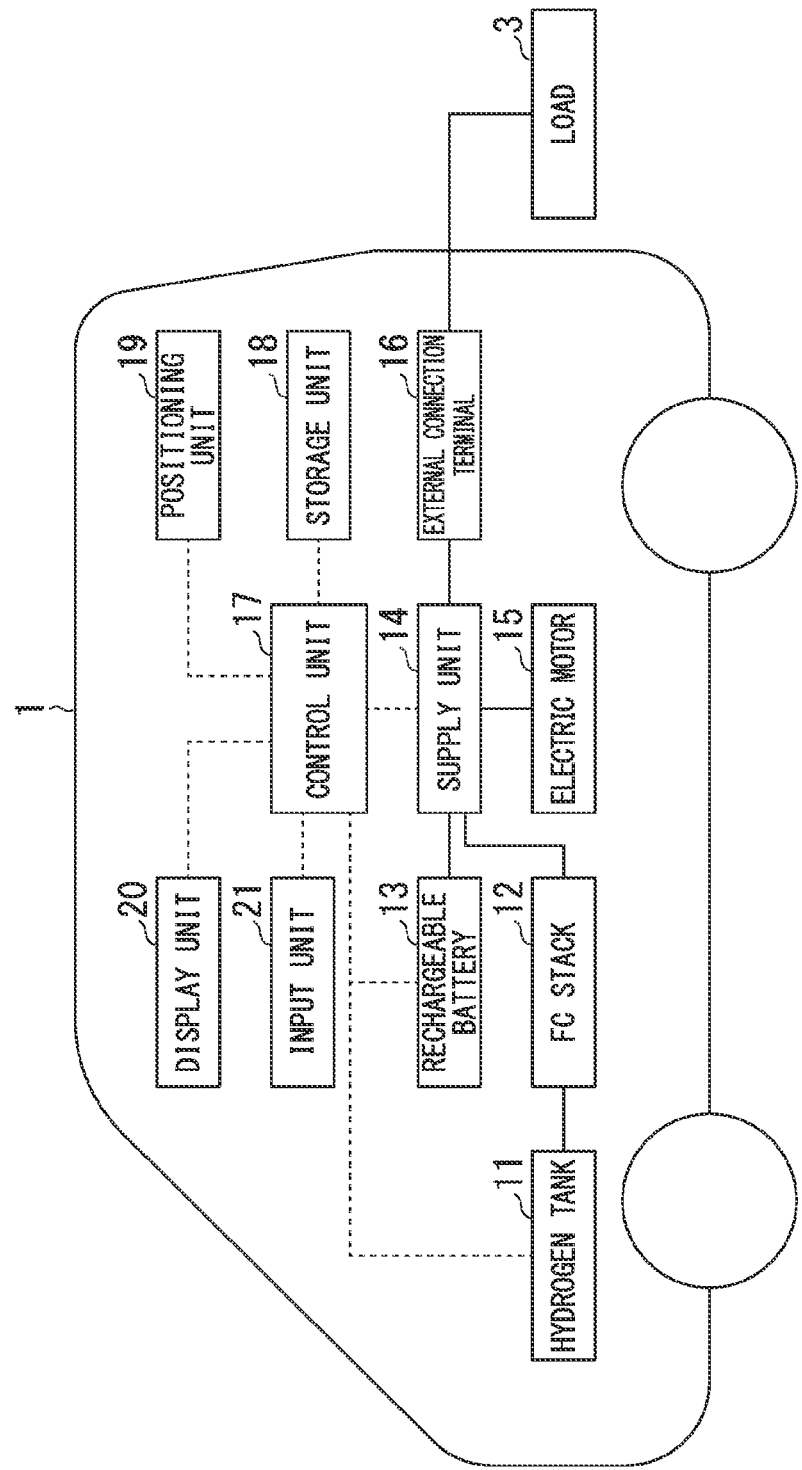
FIG. 1 is a diagram which shows a configuration example of a vehicle according to an embodiment.

FIG. 1 is a diagram which shows a configuration example of a vehicle 1 according to an embodiment. The vehicle 1 is a fuel cell car that includes a hydrogen tank 11, a fuel cell (FC) stack 12, a rechargeable battery 13, a supply unit 14, an electric motor 15, an external connection terminal 16, a control unit 17, a storage unit 18, a positioning unit 19, a display unit 20, and an input unit 21.

The hydrogen tank 11 accumulates hydrogen as first energy. The FC stack 12 generates power by causing the hydrogen accumulated in the hydrogen tank 11 to electrochemically react with oxygen in the air, and generates electric energy (power) by the power generation. The rechargeable battery 13 accumulates power as second energy supplied from the outside or the FC stack 12 via the supply unit 14. The rechargeable battery 13 supplies the accumulated power to the supply unit 14.

The supply unit 14 supplies the power supplied from either or both of the FC stack 12 and the rechargeable battery 13 to a load 3 as an external device via the external connection terminal 16 or supplies the power to the electric motor 15. The supply unit 14 supplies the power supplied from the outside to the rechargeable battery 13, and causes the rechargeable battery 13 to accumulate the power. The supply unit 14 switches destinations to which power is supplied according to control by the control unit 17.

The electric motor 15 is a drive unit that drives wheels provided in the vehicle 1 with the power supplied from the supply unit 14 and supplies the power for movement of the vehicle 1. The external connection terminal 16 is connected with electric wires when the vehicle 1 supplies power to an external load 3 and when the vehicle 1 receives power supplied from the outside.

The control unit 17 is a control device that controls the supply unit 14 or causes the display unit 20 to display information on the basis of data obtained from the hydrogen tank 11, the rechargeable battery 13, the storage unit 18, the positioning unit 19, and the input unit 21. The control unit 17 includes, for example, a hardware processor such as a central processing unit (CPU), a micro controller unit (MCU), or a micro processor unit (MPU), a temporary storage memory, and a storage device. In the control unit 17, the hardware processor may control the supply unit 14 and the display unit 20 by executing one or a plurality of program modules stored in the storage device. The control unit 17 may be realized by using an electronic circuit using hardware such as a large scale integration circuit (LSI), an application specific integrated circuit (ASIC), or a field-programmable gate array (FPGA), or may also be realized by software and hardware in cooperation. Alternatively, a computer mounted in the vehicle 1 may operate as the control unit 17.

The storage unit 18 stores the data used in the control of the supply unit 14 and the display unit 20 by the control unit 17, and data generated in the control. The positioning unit 19 measures a position of the vehicle 1 and supplies the position obtained by the measurement to the control unit 17. The positioning unit 19 receives, for example, signals emitted from a plurality of artificial satellites of a satellite positioning system, and measures the position of the vehicle 1 on the basis of the received signals.

The display unit 20 is a display device that displays information according to the control by the control unit 17. The display unit 20 displays images and text and presents information to a user. The input unit 21 receives an operation of the user and supplies the received operation to the control unit 17. A touch panel, a switch, and the like are used as the input unit 21.

A distance that the vehicle 1 can move with an amount of hydrogen filled in the hydrogen tank 11 is longer than a distance that the vehicle 1 can move with an amount of power filled in the rechargeable battery 13. This is because an amount of energy that can be extracted from the hydrogen filled in hydrogen tank 11 is larger than an amount of energy that can be accumulated in the rechargeable battery 13. Since a time required to charge the rechargeable battery 13 at a charging station is often longer than a time required to replenish the hydrogen tank 11 with hydrogen at a hydrogen station, it is often preferred by a user to reduce the number of times the rechargeable battery 13 is charged at the charging station.

[Control Processing by Control Device (Control Unit 17)]

Figure 2:
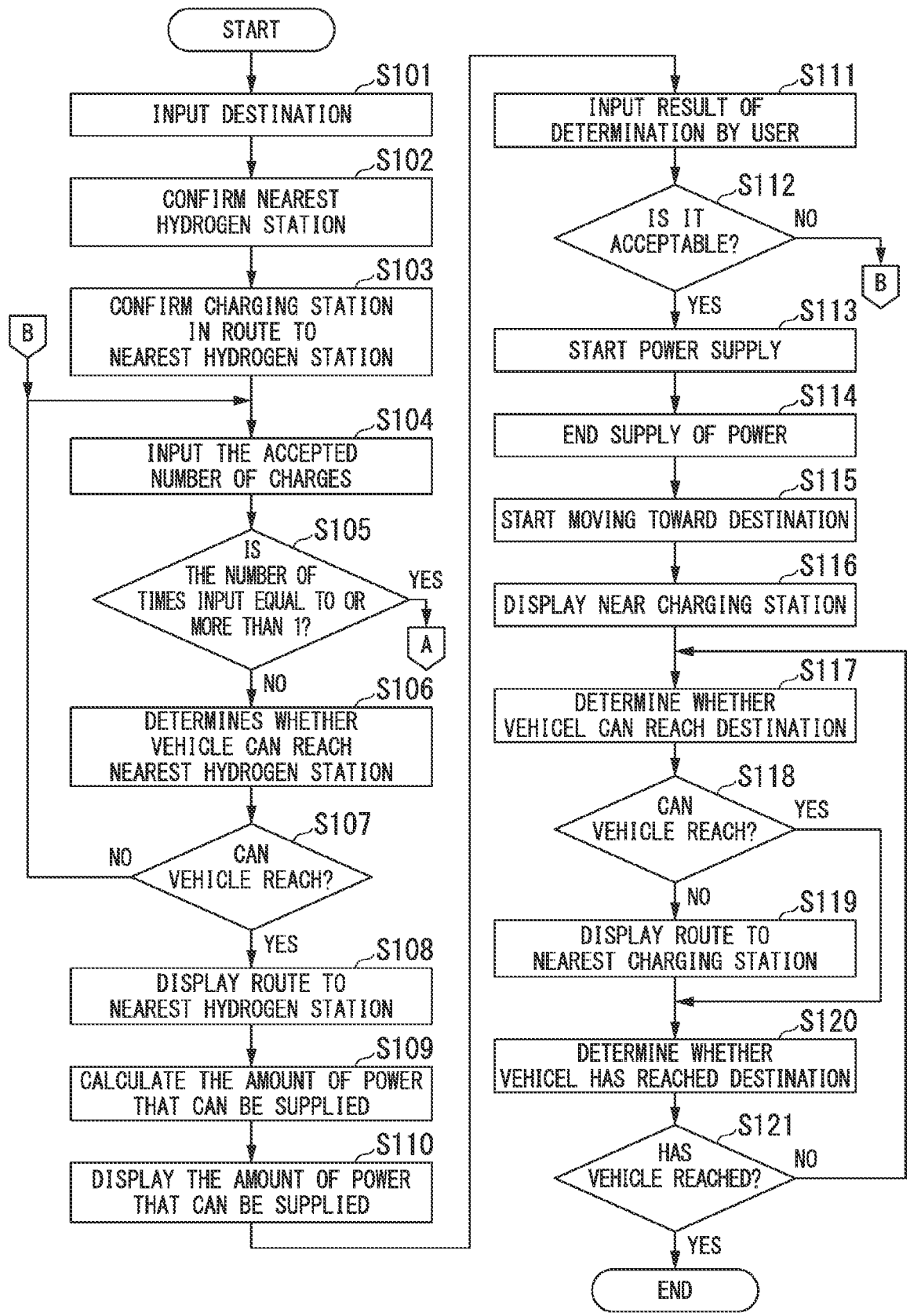
FIG. 2 is a first flowchart which shows an example of control processing performed by a control unit in the embodiment.
Figure 3:
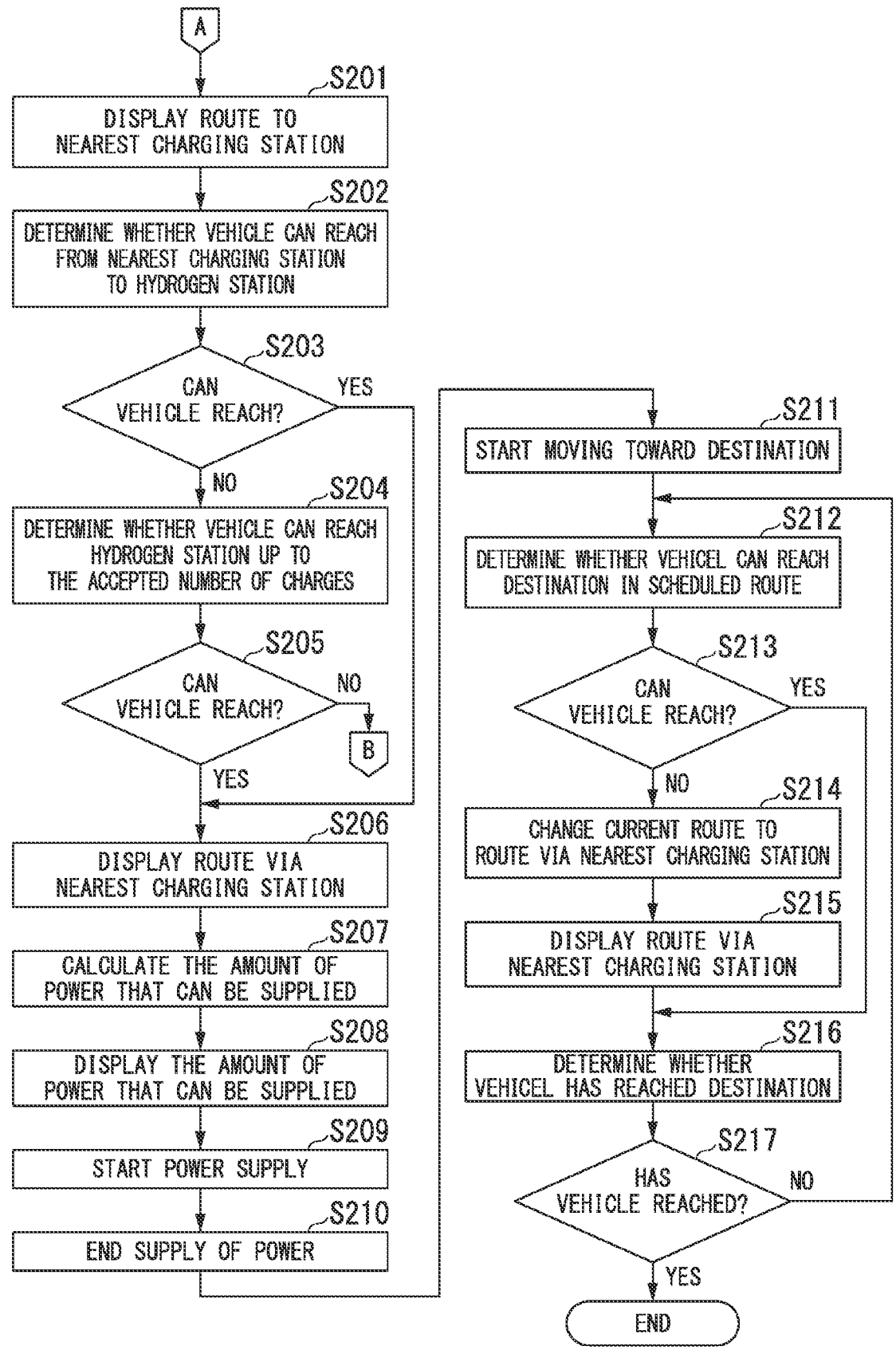
FIG. 3 is a second flowchart which shows an example of control processing performed by the control unit in the embodiment.

In the following description, control processing performed by the control unit 17 will be described with reference to FIGS. 2 and 3. FIGS. 2 and 3 are flowcharts which show an example of the control processing performed by the control unit 17 in the embodiment. If the control processing is started, the control unit 17 causes the display unit 20 to display an image prompting an input of a destination, and inputs a destination indicated by the operation of the user received by the input unit 21 (step S101). A screen that prompts the input of a destination is, for example, a screen that receives an address or a place name of the destination or a map.

The control unit 17 acquires a current position of the vehicle 1 from the positioning unit 19 and confirms a nearest hydrogen station on the basis of the current position (step S102). The control unit 17 specifies a hydrogen station closest to the current position or any hydrogen station positioned within a certain distance from the current position as the nearest hydrogen station on the basis of map data including positions of hydrogen stations stored in the storage unit 18 in advance and the current position of the vehicle 1. A hydrogen station that is a first supply station has a facility capable of supplying hydrogen as a fuel of the vehicle 1. The map data also includes a position of a charging station that is a second supply station.

The control unit 17 specifies a route from the current position of the vehicle 1 to the destination via the nearest hydrogen station confirmed in step S102 in the map data, and confirms one or a plurality of charging stations positioned at a certain distance from the specified route (step S103).

The control unit 17 causes the display unit 20 to display a screen that asks the user of the number of times the user will stop at a charging station to receive power supplied to the rechargeable battery 13 before moving to the destination input in step S101, and inputs the number of times indicated by the operation of the user, which is received by the input unit 21 (step S104). That is, the control unit 17 inputs the number of times the user will stop at a charging station to charge the rechargeable battery 13. The control unit 17 determines whether the number of charging stations to pass through is 1 or more (step S105).

When the number of times input in step S104 is not 1 or more, that is, 0 times (NO in step S105), the control unit 17 determines whether the vehicle 1 can reach the nearest hydrogen station without receiving a supply of hydrogen and power from the outside on the basis of the route specified in step S103, the amount of hydrogen accumulated in the hydrogen tank 11, and the amount of power accumulated in the rechargeable battery 13 (step S106). That is, the control unit 17 determines whether there is a route in which the vehicle 1 can reach the nearest hydrogen station without receiving the supply of hydrogen and power from the outside. The control unit 17 determines that the vehicle 1 can reach the nearest hydrogen station when the route can be detected, and determines that the vehicle 1 cannot reach the nearest hydrogen station when the route cannot be detected. In the same manner, determination on whether the vehicle 1 can reach a certain point is performed depending on whether a route based on an amount of consumable power can be detected.

The control unit 17 determines whether the vehicle 1 can reach the nearest hydrogen station using a power consumption amount per unit distance [Wh/km] or a moving distance per unit power amount [km/kWh] stored in the storage unit 18. The power consumption amount per unit distance [Wh/km] or the moving distance per unit power amount [km/kWh] may be calculated based on a past travel history of the vehicle 1. The amount of hydrogen accumulated in the hydrogen tank 11 and the amount of power accumulated in the rechargeable battery 13 are obtained from, for example, sensors provided in each of the hydrogen tank 11 and the rechargeable battery 13.

When it is determined in step S106 that the vehicle 1 cannot reach the nearest hydrogen station (NO in step S107), the control unit 17 returns the processing to step S104 and asks the user again to select the number of times the user will stop at a charging station to charge the rechargeable battery 13. Before returning the processing to step S104, the control unit 17 may cause the display unit 20 to display a message indicating that the vehicle 1 cannot reach the nearest hydrogen station with the number of times input in the previous step S104.

When it is determined in step S106 that the vehicle 1 can reach the nearest hydrogen station (YES in step S107), the control unit 17 causes the display unit 20 to display the route specified in step S103 (step S108).

The control unit 17 calculates the amount of power that can be supplied to the external load 3 on the basis of the amount of power consumed when the vehicle 1 moves along the route specified in step S103, the amount of hydrogen accumulated in the hydrogen tank 11, and the amount of power accumulated in the rechargeable battery 13 (step S109). The amount of power (E) that can be supplied to the load 3 is the amount of power obtained by subtracting the amount of power ($E_{MOV}$) consumed in the movement from a sum ($E_{H2}+E_{BAT}$) of the amount of power ($E_{H2}$) obtained by an electrochemical reaction to the hydrogen accumulated in the hydrogen tank 11 and the amount of power ($E_{BAT}$) accumulated in the rechargeable battery 13. In consideration of a variation in the amount of power ($E_{MOV}$) consumed in the movement, the amount of power ($E=E_{H2}+E_{BAT}-E_{MOV}-E_0$) that can be supplied may also be calculated by subtracting a constant amount of power ($E_0$) and the amount of power ($E_{MOV}$) from the sum ($E_{H2}+E_{BAT}$).

The control unit 17 causes the display unit 20 to display the amount of power (E) that can be supplied to the load 3, which is calculated in step S109 (step $110). Instead of the amount of power (E), the control unit 17 may cause the display unit 20 to display a time during which power can be supplied when the load 3 consumes a certain amount of power. Alternatively, the control unit 17 may cause the user to select an electric device to be used as the load 3, calculate a supply available time according to power consumed by the selected electric device, and cause the display unit 20 to display the calculated time. The user can easily understand an available time of the load 3 by displaying the supply available time rather than by displaying the amount of power, and, therefore, convenience is improved.

The control unit 17 causes the display unit 20 to display a message that prompts the user to determine whether the amount of power or the time during which power can be supplied is acceptable for the user, as well as the amount of power or the supply available time displayed on the display unit 20 in step S110, and inputs a result of the determination indicated by an operation of the user, which is received by the input unit 21 (step S111).

When a result of the determination indicating that the user cannot accept the amount of power or the supply available time displayed in step S110 is input (NO in step S112), the control unit 17 returns the processing to step S104 and asks the user to select again the number of times the user stops at a charging station to charge the rechargeable battery 13. The control unit 17 may also cause the display unit 20 to display a message that prompts an increase in the number of times the user stops at a charging station before returning the processing to step S104.

When a result of the determination indicating that the user can accept the amount of power or the supply available time displayed in step S110 is input (YES in step S112), the control unit 17 controls the supply unit 14 to supply the amount of power (E) calculated in step S109 to the load 3, and causes a power supply to the load 3 to be started (step S113). With the start of the power supply, the user can use an electric device as the load 3 with the vehicle 1 as a power source. When the amount of power supplied to the load 3 reaches the amount of power (E) calculated in step S109, or when the user instructs to stop the power supply, the control unit 17 ends the supply of power to the supply unit 14 (step S114).

When the movement to the destination input in step S101 is started by a driving operation of the vehicle 1 by the user (step S115), the control unit 17 causes the display unit 20 to display the route specified in step S103 and, at the same time, causes the display unit 20 to display positions of one or more charging stations confirmed in step S103 (step S116). By causing the display unit 20 to perform such a display, it is possible to guide the user to the route to the destination via the hydrogen station, and to present the position of a charging station positioned near the route to the user.

The control unit 17 replenishes the hydrogen tank 11 with hydrogen at a nearest hydrogen station and determines whether the vehicle 1 can reach the destination on the basis of the route to the destination via the nearest hydrogen station, the current position of the vehicle 1 obtained from the positioning unit 19, the amount of hydrogen accumulated in the hydrogen tank 11, and the amount of power accumulated in the rechargeable battery 13 (step S117). The control unit 17 determines whether the vehicle 1 can reach the destination on a premise that the hydrogen tank 11 is filled with hydrogen at the nearest hydrogen station. Alternatively, the control unit 17 determines whether the vehicle 1 can reach the destination on a premise that the hydrogen tank 11 is replenished with hydrogen until a predetermined amount is reached at the nearest hydrogen station. The predetermined amount may be, for example, half a capacity of the hydrogen tank 11 or may also be 80% of the capacity.

When it is determined in step S117 that the vehicle 1 can reach the destination (YES in step S118), the control unit 17 advances the processing to step S120.

When it is determined in step S117 that the vehicle 1 cannot reach the destination (NO in step S118), the control unit 17 causes the display unit 20 to display the route to a nearest charging station and updates the route to the destination via a nearest hydrogen station (step S119). By displaying the route to the nearest charging station, the control unit 17 prompts the user to charge the rechargeable battery 13 at the nearest charging station. The control unit 17 may cause the display unit 20 to display not only the route to the nearest charging station but also a message indicating that the amount of hydrogen and the amount of power are insufficient. A new route obtained by the update will be a route to the destination via the nearest charging station and the nearest hydrogen station.

The control unit 17 may select a charging station closest to the current position of the vehicle 1 as the nearest charging station to be displayed on the display unit 20 in step S119, or may also select a charging station positioned within a reachable range using the amount of hydrogen accumulated in the hydrogen tank 11 and the amount of power accumulated in battery 13. Alternatively, the control unit 17 causes the display unit 20 to display a plurality of charging stations positioned within the reachable range using the amount of hydrogen accumulated in the hydrogen tank 11 and the amount of power accumulated in the rechargeable battery 13, or may also cause the user to select the nearest charging station.

The control unit 17 determines whether the vehicle 1 has reached the destination on the basis of the current position of the vehicle 1 obtained from the positioning unit 19 (step S120).

When it is determined in step S120 that the vehicle 1 has not reached the destination (NO in step S121), the control unit 17 returns the processing to step S117, and repeats operations of step S117 to step S121 until the vehicle reaches the destination. The control unit 17 may repeat the operations of step S117 to step S121 at certain time intervals, or may also repeat the operations whenever the vehicle moves a certain distance.

When it is determined in step S120 that the vehicle 1 has reached the destination (YES in step S121), the control unit 17 ends the control processing.

When the number of times input in step S104 is equal to or more than 1 (YES in S105), the control unit 17 specifies the nearest charging station on the basis of the current position of the vehicle 1 acquired from the positioning unit 19, and causes the display unit 20 to display a route to the specified nearest charging station (step S201). The control unit 17 specifies a charging station closest to the current position of the vehicle 1 or any one of charging stations positioned within a certain distance from the current position as the nearest charging station on the basis of map data including the positions of charging stations stored in the storage unit 18 in advance and the current position of the vehicle 1. Alternatively, the control unit 17 may cause the display unit 20 to display the positions of the charging stations within a certain distance from the current position or may also cause the user to select the nearest charging station.

The control unit 17 determines whether the vehicle 1 can reach the nearest hydrogen station after charging the rechargeable battery 13 at the nearest charging station on the basis of the current position of the vehicle 1 acquired from the positioning unit 19, the map data stored in the storage unit 18, the amount of hydrogen accumulated in the hydrogen tank 11, and the amount of power accumulated in the rechargeable battery 13 (step S202). The control unit 17 determines whether the vehicle 1 can reach at the nearest hydrogen station on a premise that the rechargeable battery 13 is replenished with a predetermined amount of power at the nearest charging station. As the predetermined amount of power, the amount of power that can be replenished during a predetermined charging time set by the user in advance may be used, or a predetermined amount of power may be used. Alternatively, the control unit 17 may input the amount of power with which the rechargeable battery 13 is replenished at the charging station or a supply time to charge the rechargeable battery 13 at the charging station from the operation of the user, which is received by the input unit 21.

When it is determined in step S202 that the vehicle 1 can reach the nearest hydrogen station (YES in step S203), the control unit 17 advances the processing to step S206.

When it is determined in step S202 that the vehicle 1 cannot reach the nearest hydrogen station (NO in step S203), the control unit 17 increases the number of times the user stops at a charging station to charge the rechargeable battery 13 up to the number of times input in step S104, and determines whether the vehicle 1 can reach the nearest hydrogen station (step S204). The control unit 17 determines whether the vehicle 1 can reach the nearest hydrogen station on a premise that the rechargeable battery 13 is replenished with the predetermined amount of power at each charging station.

If it is determined in step S204 that vehicle 1 can reach the nearest hydrogen station (YES in step S205), the control unit 17 detects a route to the destination including a route to the nearest hydrogen station detected in step S202 or step S204, and causes the display unit 20 to display a route to the destination via the route to the charging station at which the user stops to charge the rechargeable battery 13 and the nearest hydrogen station (step S206).

The control unit 17 calculates the amount of power that can be supplied to the external load 3 on the basis of the amount of power consumed when the vehicle 1 moves to the nearest charging station along the route detected in step S206, the amount of hydrogen accumulated in the hydrogen tank 11, and the amount of power accumulated in the rechargeable battery 13 (step S207). The amount of power (E') that can be supplied to the load 3 is the amount of power obtained by subtracting the amount of power ($E'_{MOV}$) consumed by the movement to the nearest charging station from the sum ($E_{H2}+E_{BAT}$) of the amount of power ($E_{H2}$) obtained by the electrochemical reaction to hydrogen accumulated in the hydrogen tank 11 and the amount of power ($E_{BAT}$) accumulated in the rechargeable battery 13. In consideration of a variation in the amount of power ($E'_{MOV}$) consumed by the movement, the amount of power ($E'=E_{H2}+E_{BAT}-E'_{MOV}-E'_0$) that can be supplied may also be calculated by subtracting a certain amount of power ($E'_0$) and the amount of power ($E'_{MOV}$) from the sum ($E_{H2}+E_{BAT}$) in the same manner as the calculation in step S109.

The control unit 17 causes the display unit 20 to display the amount of power (E') that can be supplied to the load 3, which is calculated in step S207 (step S208). Instead of the amount of power (E'), the control unit 17 may cause the display unit 20 to display a time during which power can be supplied when the load 3 consumes a certain amount of power. Alternatively, the control unit 17 causes the user to select an electric device to be used as the load 3, calculates the supply available time according to power consumed by the selected electric device, and causes the display unit 20 to display the calculated time.

The control unit 17 controls the supply unit 14 such that it supplies the amount of power (E') calculated in step S207 to the load 3, and causes the power supply to the load 3 to be started (step S209). With the start of the power supply, the user can use an electric device as the load 3 with the vehicle 1 as a power source. If the amount of power supplied to the load 3 reaches the amount of power (E') calculated in step S207, or if the user instructs to stop the power supply, the control unit 17 ends the supply of power to the supply unit 14 (step S210).

If a movement to the destination input in step S101 is started by the driving operation of the vehicle 1 by the user (step S211), the control unit 17 determines whether the vehicle 1 can reach the destination along the route detected in step S206 (step S212). The control unit 17 determines whether the vehicle 1 can reach the destination on a premise that the rechargeable battery 13 is replenished with a predetermined amount of power at each charging station and the hydrogen tank 11 is filled with hydrogen at the nearest hydrogen station. The control unit 17 may determine whether the vehicle 1 can reach the destination on a premise that the hydrogen tank 11 is replenished with hydrogen up to a predetermined amount at the nearest hydrogen station.

When it is determined in step S212 that the vehicle 1 can reach the destination (YES in step S213), the control unit 17 advances the processing to step S216.

When it is determined in step S212 that the vehicle 1 cannot reach the destination (NO in step S213), the control unit 17 changes a current route to a route via the charging station (step S214). The control unit 17 causes the display unit 20 to display a new route obtained by the change (step S215). The control unit 17 may cause the display unit 20 to display the new route and causes the display unit 20 to display a message notifying the user that the route has been changed.

The control unit 17 determines whether the vehicle 1 has reached the destination on the basis of a current position of the vehicle 1 obtained from the positioning unit 19 (step S216).

When it is determined in step S216 that the vehicle 1 has not reached the destination (NO in step S217), the control unit 17 returns the processing to step S212 and repeats operations of step S212 to step S217 until the vehicle reaches the destination. The control unit 17 may repeat the operations of step S212 to step S217 at certain time intervals, or may repeat the operations whenever the vehicle moves a certain distance.

When it is determined in step S216 that the vehicle 1 has reached the destination (YES in step S217), the control unit 17 ends the control processing.

When the control unit 17 uses the vehicle 1 as a power source for supplying power to the load 3 by performing the control processing described with reference to FIGS. 2 and 3, it causes the display unit 20 to display information including either or both of the amount of power that can be supplied to the load 3 and the supply available time. The control unit 17 causes the display unit 20 to display such information, and thereby the user can know not only a result of determining whether the load 3 can be used but also a time when the load 3 can be used, and the convenience is improved.

Since the control unit 17 calculates the amount of power that can be supplied to the load 3 on the basis of the number of times the user stops at a charging station, which is selected by the user, the user can select a balance between the number of times the user stops at a charging station and the time when the load 3 can be used. In this manner, since the amount of power that can be supplied to the load 3 is determined by reflecting an intention of the user, it is possible to further improve the convenience of the user. The intention of the user for a reduction in a distance that the moving body can move can be reflected in a determination on whether the vehicle 1 can be used as a power source, and the convenience of the user can be further improved.

The control unit 17 determines whether there is a remaining amount of hydrogen and power required for the vehicle 1 to reach the destination while the vehicle 1 is moving toward the destination, and prompts the user to perform charging at a charging station when the remaining amount of hydrogen and power is insufficient. The control unit 17 performs such an operation, and thereby the control unit 17 can prevent the vehicle 1 from being unable to reach the destination even when a consumption amount of hydrogen and power increases due to traffic congestion or the like. The control unit 17 can prevent the vehicle 1 from being unable to reach the destination because the vehicle 1 is used as a power source, and can further improve the convenience of the user.

Figure 4:
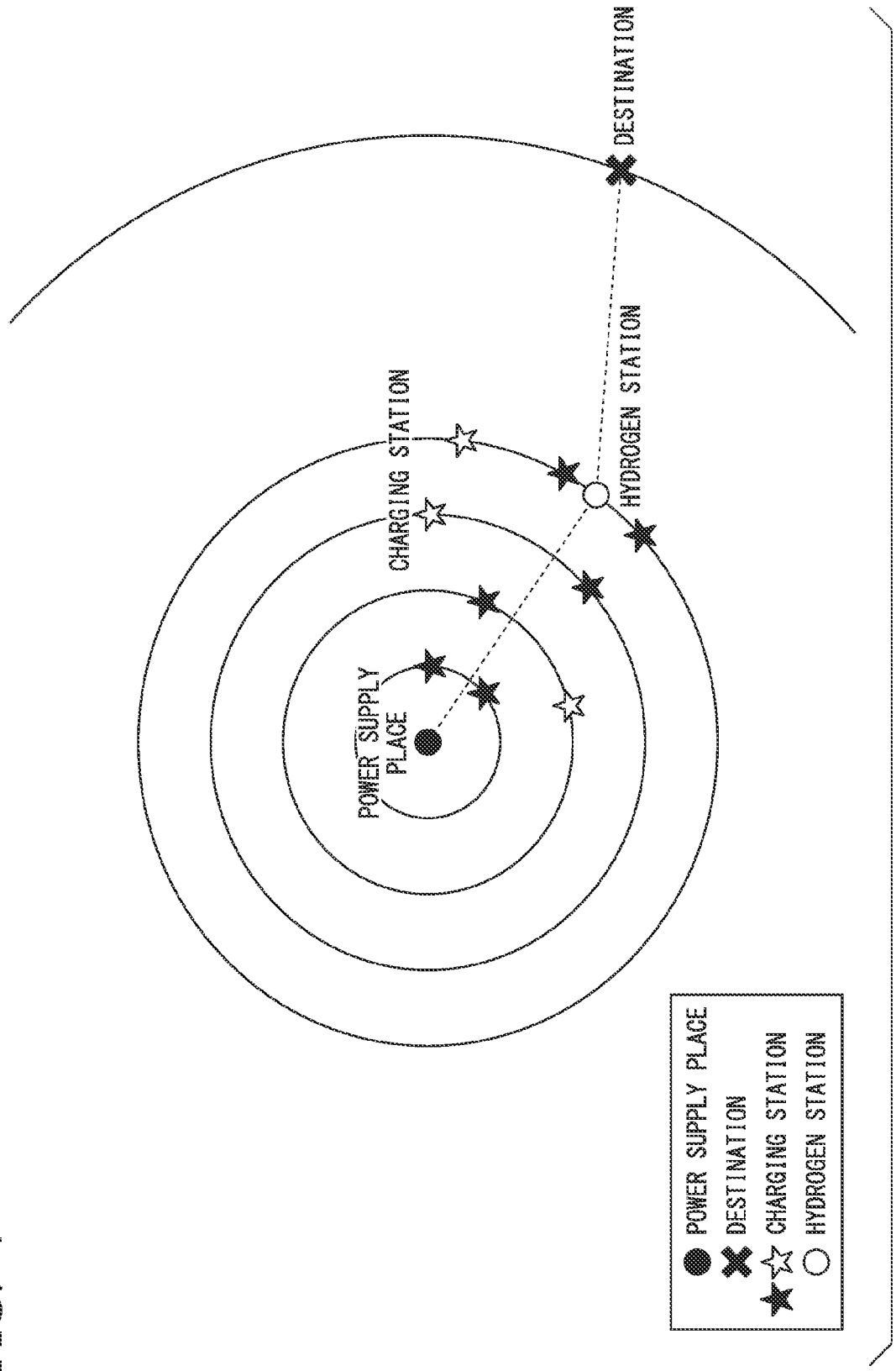
FIG. 4 is a diagram which shows a route and a display example when 0 times is selected as the number of times a user stops at a charging station.
Figure 5:
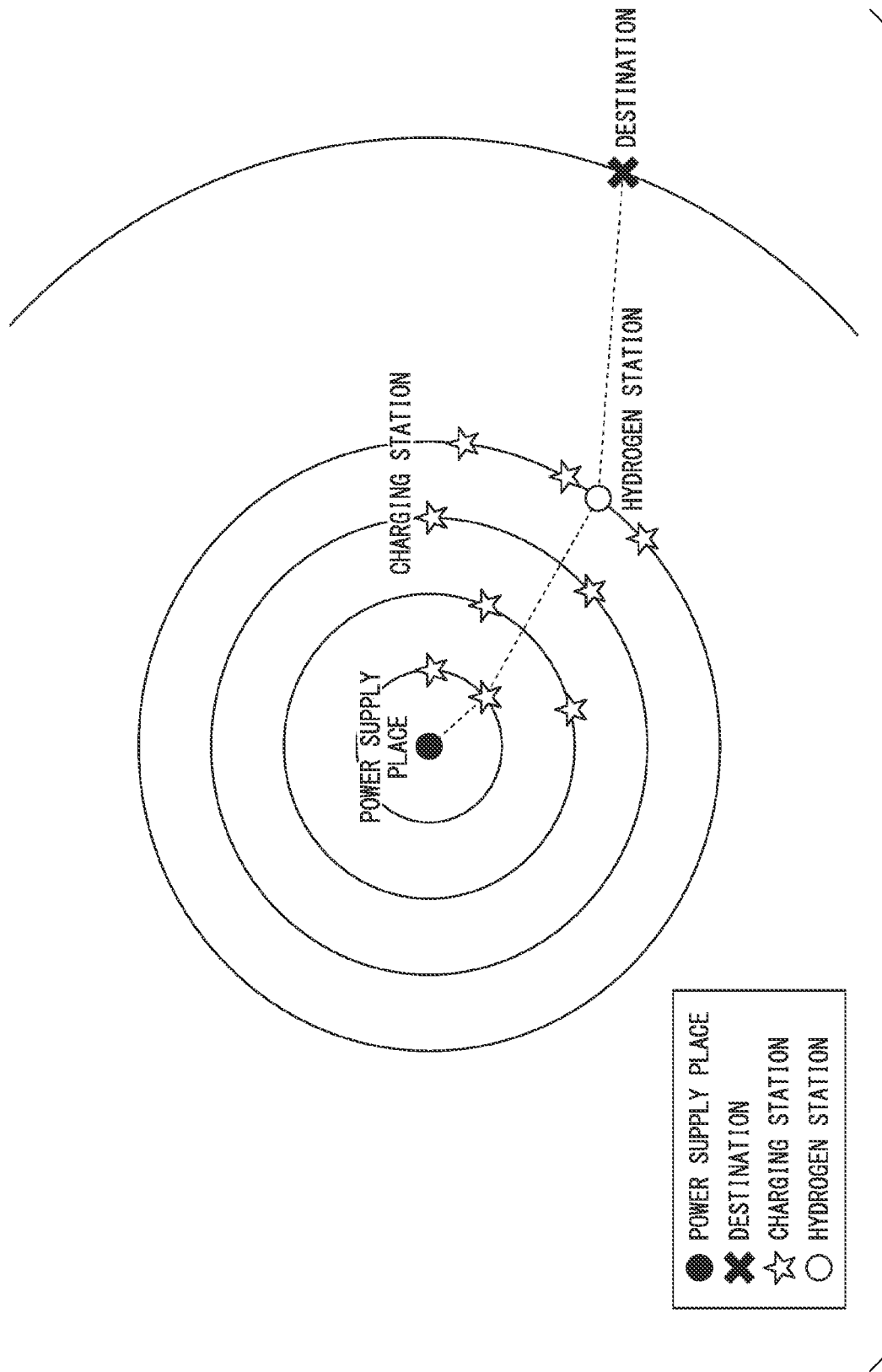
FIG. 5 is a diagram which shows a route and a display example when one time is selected as the number of times a user stops at the charging station.
Figure 6:
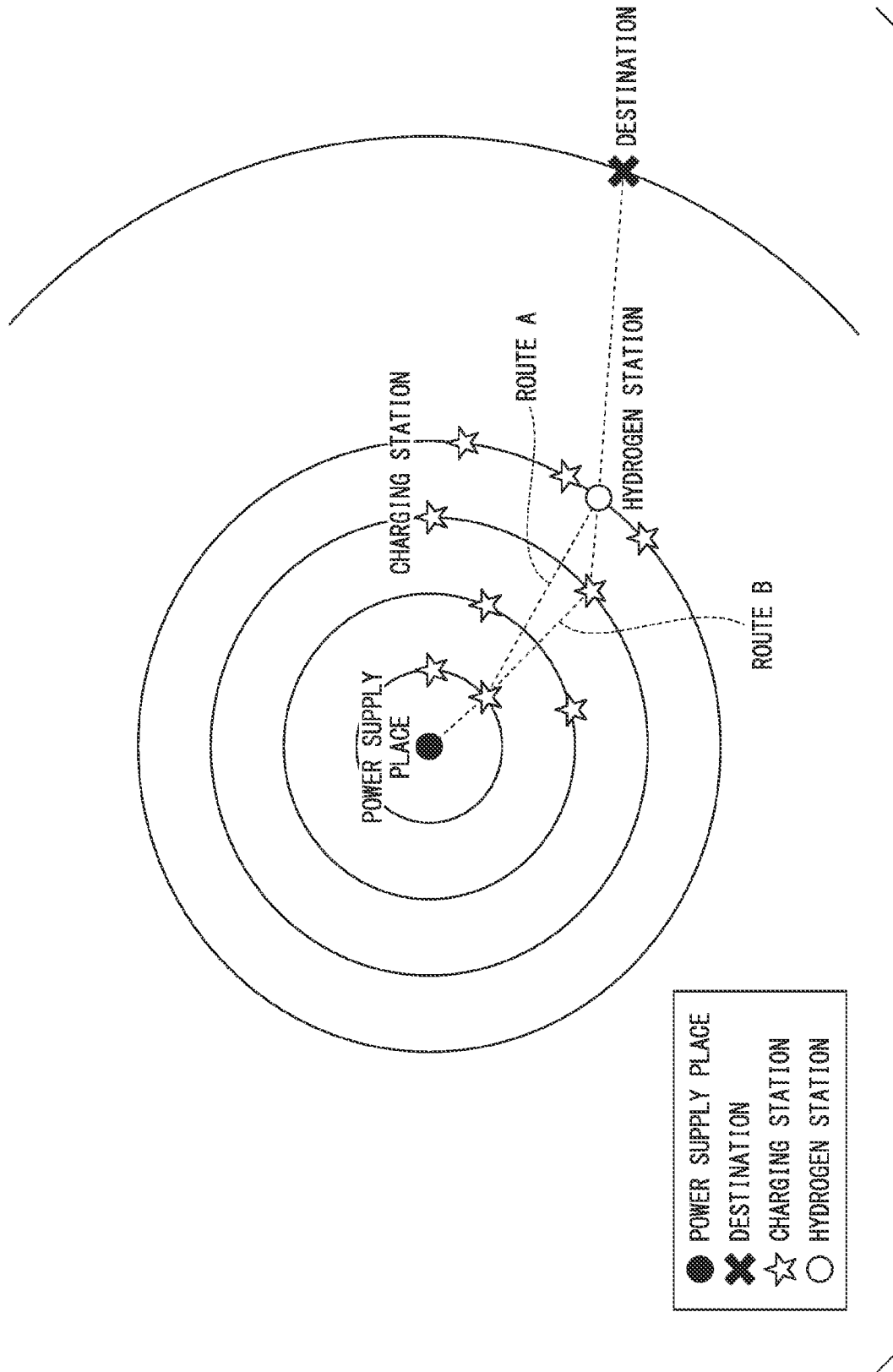
FIG. 6 is a diagram which shows a route and a display example when two times is selected as the number of times a user stops at the charging station.

FIGS. 4, 5 and 6 are diagrams which show examples of a route according to the number of times the user stops at a charging station in the embodiment. FIG. 4 is a diagram which shows a route and a display example when the user selects 0 times as the number of times the user stops at a charging station. In the example shown in FIG. 4, a route when the user wants to reach the destination via the nearest hydrogen station without stopping at a charging station is shown. The position of a charging station positioned near the route is presented to the user.

FIG. 5 is a diagram which shows a route and a display example when the user selects one time as the number of times the user stops at a charging station. In the example shown in FIG. 5, a route when the user wants to reach the destination via the nearest hydrogen station after stopping at a charging station once is shown.

FIG. 6 is a diagram which shows a route and a display example when the user selects two times as the number of times the user stops at a charging station. In the example shown in FIG. 6, a route when the user wants to reach the destination via the nearest hydrogen station after stopping at a charging station once or twice is shown. A route A, which reaches the destination via the hydrogen station after stopping at a charging station once, and a route B, which reaches the destination via the hydrogen station after stopping at a charging station twice, are shown. When a plurality of routes are acquired in this manner, the control unit 17 may preferentially select a route with the smaller number of times the user stops at a charging station, or may present the plurality of routes to the user for a selection by the user.

Modified Example

In the control processing described above, the control unit 17 calculates the amount of power that can be supplied to the load 3 on the basis of the number of times the user stops at a charging station, which is selected by the user, that is, the number of charges that is acceptable to the user. However, the control unit 17 may perform control processing based on restrictions other than the number of charges. For example, the control unit 17 may also perform the control processing on the basis of a time during which power is supplied to the load 3 using the vehicle 1 as a power source (hereinafter, referred to as a "scheduled power supply time").

FIG. 7 is a flowchart which shows an example of the control processing performed by the control unit 17 in the modified example. When the control processing is started, the control unit 17 causes the display unit 20 to display a message prompting an input of a scheduled power supply time, and inputs a scheduled power supply time indicated by the operation of the user, received by the input unit 21 (step S301). The control unit 17 may cause power consumption [kWh] per unit time of an electric device used by the user as the load 3 to be selected.

The control unit 17 causes the display unit 20 to display an image prompting the input of a destination, and inputs a destination indicated by the operation of the user, received by the input unit 21 (step S302).

The control unit 17 determines whether the vehicle 1 can reach the nearest hydrogen station without stopping at a charging station on the basis of the current position of the vehicle 1 acquired from the positioning unit 19, the map data stored in the storage unit 18, the amount of hydrogen accumulated in the hydrogen tank 11, and the amount of power accumulated in the rechargeable battery 13, and the amount of power supplied to the load 3 (step S303). Specifically, the control unit 17 determines whether the sum ($E_{H2}+E_{BAT}$) of the amount of power ($E_{H2}$) obtained by the electrochemical reaction to the hydrogen accumulated in the hydrogen tank 11 and the amount of power ($E_{BAT}$) accumulated in the rechargeable battery 13 is larger than a sum ($E_{MOV}+E$) of the amount of power ($E_{MOV}$) consumed by the movement and the amount of power (E) supplied to the load 3. When the amount of power ($E_{H2}+E_{BAT}$) is larger than the amount of power ($E_{MOV}+E$), the control unit 17 determines that the vehicle 1 can reach the nearest hydrogen station. The control unit 17 may use a result of multiplication obtained by multiplying the scheduled power supply time input in step S301 by predetermined power consumption, or a result of multiplication obtained by multiplying the scheduled power supply time input in step S301 by power consumption selected by the user as the amount of power supplied to the load 3.

When it is determined in step S303 that the vehicle 1 can reach the nearest hydrogen station (YES in step S304), the control unit 17 detects a route to the destination via the nearest hydrogen station and causes the display unit 20 to display the detected route (step S305). Then, the control unit 17 advances the processing to step S209.

When it is determined in step S303 that the vehicle 1 cannot reach the nearest hydrogen station (NO in step S305), the control unit 17 detects a route to the destination via the nearest hydrogen station after stopping at a charging station on the basis of the map data stored in the storage unit 18 and the current position of the vehicle 1, and causes the display unit 20 to display the detected route (step S306). In the detection of a route, the control unit 17 searches for a route on a premise that a predetermined amount of power is replenished to the rechargeable battery 13 at a charging station.

The control unit 17 causes the display unit 20 to display a message prompting to determine whether a route displayed on the display unit 20 is acceptable to the user, and inputs a result of the determination indicated by the operation of the user, received by the input unit 21 (step S307).

When a result of the determination indicating that the user cannot accept the route displayed in step S306 is input (NO in step S308), the control unit 17 returns the processing to step S301 and prompts the user to input a scheduled power supply time again. The control unit 17 may also cause the display unit 20 to display a message prompting to shorten the scheduled power supply time before returning the processing to step S301.

When a result of the determination indicating that the user can accept the route displayed in step S306 is input (YES in step S308), the control unit 17 advances the processing to step S209. Since operations of the control unit 17 in step S209 and thereafter are the same as respective operations of step S209 to step S217 described with reference to FIG. 3, duplicated description will be omitted.

The control unit 17 performs the control processing exemplified in FIG. 7, and thereby the user can select a route to the destination by giving priority to a scheduled power supply time during which the load 3 is used with the vehicle 1 set as the power source. With such control processing, the vehicle 1 that reflects the intention of the user can be used, and the convenience of the user can be further improved.

The above-described embodiment can be expressed as follows.

A control device is a control device of a moving body that includes a first accumulation unit configured to accumulate first energy, a second accumulation unit configured to accumulate second energy different from the first energy, and a supply unit configured to supply either or both of second energy obtained by converting first energy accumulated by the first accumulation unit and second energy accumulated by the second accumulation unit to an external device, and is configured to include a storage device or a memory configured to store a program module, and a hardware processor, in which, when the hardware processor has executed the program module, the amount of second energy that can be supplied from the supply unit to the external device is calculated on the basis of the amount of second energy supplied to a drive unit via the supply unit to move the moving body to a destination, the amount of first energy accumulated by the first accumulation unit, and the amount of second energy accumulated by the second accumulation unit, and a display unit is caused to display a supply available time according to the calculated amount of second energy.

The above-described embodiment can also be expressed as follows.

A control device is a control device of a moving body that includes a first accumulation unit configured to accumulate first energy, a second accumulation unit configured to accumulate second energy different from the first energy, and a supply unit configured to supply either or both of second energy obtained by converting first energy accumulated by the first accumulation unit and second energy accumulated by the second accumulation unit to an external device, and is configured to include a storage device or a memory configured to store a program module, and a hardware processor, in which, when the hardware processor has executed the program module, a scheduled power supply time during which second energy is supplied to the external device from the supply unit is received, a route to the destination is detected on the basis of the amount of second energy supplied to a drive unit via the supply unit to move the moving body to the destination, the amount of first energy accumulated by the first accumulation unit, and the amount of second energy accumulated by the second accumulation unit, and the amount of second energy supplied to the external device calculated based on the scheduled power supply time, and a display device is caused to display the detected route.

The above-described embodiment can also be expressed as follows.

A control device is a control device of a moving body that includes a fuel tank configured to accumulate fuel, a rechargeable battery configured to accumulate power, and a supply unit configured to supply either or both of power obtained by converting fuel accumulated in the fuel tank and power accumulated in the rechargeable battery to an external device, in which the amount of power that can be supplied from the supply unit to the external device is calculated on the basis of the amount of power supplied to a drive unit via the supply unit to move the moving body to the destination, the amount of fuel accumulated in the fuel tank, and the amount of power accumulated by the rechargeable battery, and a display device is caused to display a supply available time according to the calculated amount of power.

Although the modes for implementing the present invention have been described as above using the embodiments, the present invention is not limited to these embodiments, and various modifications and substitutions can be added within a range not departing from the gist of the present invention. For example, although an example in which the vehicle 1 is a fuel cell car has been described, a car equipped with a generator combined with an internal combustion engine instead of the FC stack 12 may be used as the vehicle 1. In this case, the vehicle 1 includes a fuel tank (a first accumulation unit) that accumulates fuel other than hydrogen, for example, gasoline or light oil, instead of the hydrogen tank 11.

What is claimed is:
1. A control device of a moving body that includes
a first accumulation unit configured to accumulate hydrogen,
a second accumulation unit configured to accumulate power different from the hydrogen, and
a supply unit configured to supply either or both of the power obtained by converting the hydrogen accumulated by the first accumulation unit and the power accumulated by the second accumulation unit to either or both of an external device and a drive unit,
wherein an amount of power capable of being supplied from the supply unit to the external device is calculated based on an amount of power supplied to the drive unit via the supply unit that moves the moving body to a destination, an amount of hydrogen accumulated by the first accumulation unit, and an amount of power accumulated by the second accumulation unit, and
a display device is caused to display a supply available time according to the calculated amount of power,
wherein the amount of power capable of being supplied from the supply unit to the external device is calculated based on a result of selection by a user on whether to receive a supply of the power at a second supply station that supplies the power until the moving body reaches a first supply station that supplies the hydrogen, an amount of power supplied to the drive unit via the supply unit that moves the moving body to the first supply station, the amount of hydrogen accumulated by the first accumulation unit, and the amount of power accumulated by the second accumulation unit.

2. The control device according to claim 1,
wherein, when an instruction indicating that the user does not accept the supply available time displayed on the display device is received, a selection of whether to receive the supply of the power at the second supply station or a selection of the number of times the supply of the power is received at the second supply station is received again, and the amount of power that is capable of being supplied from the supply unit to the external device is calculated based on a result of the selection performed again by the user, the amount of power supplied to the drive unit via the supply unit that moves the moving body to the first supply station, the amount of hydrogen accumulated by the first accumulation unit, and the amount of power accumulated by the second accumulation unit.

3. The control device according to claim 1,
wherein a supply time during which the supply of the power is received at the second supply station or the amount of power is received, and the amount of power capable of being supplied from the supply unit to the external device is calculated based on a received supply time or a received amount of power, the amount of power supplied to the drive unit via the supply unit that moves the moving body to the first supply station, the amount of hydrogen accumulated by the first accumulation unit, and the amount of power accumulated by the second accumulation unit.

4. The control device according to claim 1,
wherein a distance that the moving body moves with the amount of hydrogen filled in the first accumulation unit is longer than a distance that the moving body moves with the amount of power filled in the second accumulation unit.

5. A control method comprising:
by a computer installed in a moving body that includes a first accumulation unit configured to accumulate hydrogen, a second accumulation unit configured to accumulate power different from the hydrogen, and a supply unit configured to supply either or both of the power obtained by converting the hydrogen accumulated by the first accumulation unit and the power accumulated by the second accumulation unit to an external device, a drive unit, or both the external device and the drive unit, calculating an amount of power capable of being supplied from the supply unit to the external device based on an amount of power supplied to the drive unit via the supply unit that moves the moving body to a destination, the amount of hydrogen accumulated by the first accumulation unit, and an amount of power accumulated by the second accumulation unit; and causing a display unit to display a supply available time according to the calculated amount of power, wherein the calculating the amount of power capable of being supplied from the supply unit to the external device is based on a result of selection by a user on whether to receive a supply of the power at a second supply station that supplies the power until the moving body reaches a first supply station that supplies the hydrogen, an amount of power supplied to the drive unit via the supply unit that moves the moving body to the first supply station, the amount of hydrogen accumulated by the first accumulation unit, and the amount of power accumulated by the second accumulation unit.

6. A computer-readable non-transitory recording medium that stores a program causing a computer of a moving body, which includes a first accumulation unit configured to accumulate hydrogen, a second accumulation unit configured to accumulate power different from the hydrogen, and a supply unit configured to supply either or both of the power obtained by converting hydrogen accumulated by the first accumulation unit and the power accumulated by the second accumulation unit to either of both of an external device and a drive unit, to execute calculating the amount of power capable of being supplied from the supply unit to the external device based on an amount of power supplied to the drive unit via the supply unit that moves the moving body to a destination, an amount of hydrogen accumulated by the first accumulation unit, and an amount of power accumulated by the second accumulation unit; and causing a display unit to display a supply available time according to the calculated amount of power, wherein calculating the amount of power capable of being supplied from the supply unit to the external device is based on a result of selection by a user on whether to receive a supply of the power at a second supply station that supplies the power until the moving body reaches a first supply station that supplies the hydrogen, an amount of power supplied to the drive unit via the supply unit that moves the moving body to the first supply station, the amount of hydrogen accumulated by the first accumulation unit, and the amount of power accumulated by the second accumulation unit.

* * * * *